United States Patent [19]

Nordgren

[11] 4,042,180

[45] Aug. 16, 1977

[54] FEEDING AND RATIONING EQUIPMENT FOR MECHANICAL WOOD PULP, PRODUCTION WASTE AND EQUIVALENT

[75] Inventor: Gunnar Nordgren, Helsinki, Finland

[73] Assignee: Oy. Suomen Vanutehdas - Finnwad Ltd., Helsinki, Finland

[21] Appl. No.: 649,283

[22] Filed: Jan. 15, 1976

Related U.S. Application Data

[63] Continuation of Ser. No. 516,928, Oct. 22, 1974, abandoned.

[30] Foreign Application Priority Data

Dec. 21, 1973 Finland .................................. 3955/73

[51] Int. Cl.² ............................................. B02C 23/10
[52] U.S. Cl. .................................... 241/79; 241/101 B
[58] Field of Search ..................... 241/79, 79.1, 101 B

[56] References Cited

U.S. PATENT DOCUMENTS

| 3,675,859 | 7/1972 | Mitchell | 241/79 X |
| 3,790,091 | 4/1974 | Law et al. | 241/79 X |

*Primary Examiner*—Roy Lake
*Assistant Examiner*—Howard N. Goldberg
*Attorney, Agent, or Firm*—Ladas, Parry, Von Gehr, Goldsmith & Deschamps

[57] ABSTRACT

A feeding and rationing equipment for mechanical wood pulp, production waste and equivalent comprises a sheet tearing unit, a tearing unit for wood pulp, a distributor unit receiving the pre-flaked and mixed raw-materials from the tearing units. The distributor unit also comprises mixing and rationing devices. The material is transported through a number of cyclones to a feeding unit formed as a vertical pipe with a hinged door receiving blows in the outward direction from a flywheel and camshaft arrangement. The feeding unit feeds the raw-material to mills for further treatment.

5 Claims, 7 Drawing Figures

FEEDING AND RATIONING EQUIPMENT FOR MECHANICAL WOOD PULP, PRODUCTION WASTE AND EQUIVALENT

CROSS-REFERENCE TO RELATED APPLICATION

This is a continuation of application Ser. No. 516,928 filed Oct. 22, 1974 and now abandoned.

FIELD OF THE INVENTION

The present invention relates to a feeding and rationing equipment for mechanical wood pulp, production waste and equivalent.

The equipment in accordance with the invention is designated mainly for use in the production of products used in the field of hygiene, such as sanitary napkins, baby diapers, and sanitary diapers. The equipment is also suitable for other end uses in which dry pulp that has been defibrated in a hammer mill, disc refiner or any other similar mill is used. More precisely speaking, the purpose of the equipment in accordance with the present invention is to treat raw material comprising dry sheet cellulose, flake-dried dry wool pulp or production waste by pre-tearing flakes, and rationing, transporting, mixing, and distributing the flakes via one or more rationing devices into respective hammer mills, plate mills or equivalent so that an appropriately uniform supply is obtained. Products of uniform quality, such as the above-mentioned hygiene-related products, can be produced from these flakes.

DESCRIPTION OF THE PRIOR ART

Methods that have been used previously are:
a. feeding of bleached cellulose pulp in roll form through feeding rollers as a uniform stripe into the mill concerned.
b. by means of guillotine, cutting the bale into stripes and further grinding of the stripes and their rationing in hammer mills, screw elevators, etc.
c. tearing of an entire bale in chaff cutters and crushing and rationing in hammer mills, screw elevators, etc.
d. feeding of sheets into a hammer mill etc. The biggest drawback of the method mentioned under (a) is the high cost and scarce availability of roll pulp.

A drawback of the method mentioned under (b) is the higher cost of the machinery. Consequently, this method is suitable mainly for large production plants alone.

One drawback of the method mentioned under (c) is the same as that of the method mentioned under (b). Moreover, the known bale tearing devices often leave a sharp chaff edge that is difficult to defibrate by grinding in a hammer mill. Also, the quality of the chaff may vary when the rest of the bale falls into the tearing device and the stress on the screen is changed briefly.

The drawback of the method mentioned under (d) is that the hammer mill stirs up the sheets excessively and that flake-dried pulp cannot be fed into the mill as such. If a mill to perform the method mentioned under (d) were constructed, its power requirement and production cost would also be higher.

SUMMARY OF THE INVENTION

The purpose of the present invention is elimination of the above drawbacks. The equipment in accordance with the present invention is mainly characterized in that it comprises:
 a. a sheet tearing unit
 b. a tearing unit for wood pulp
 c. a distributor unit to which pre-crushed and mixed raw-materials received from said two tearing units are arranged to be fed, said distributor unit comprising at the bottom end thereof a mixing mechanism and rationing devices,
 d. at least one first cyclone through which said raw-materials are arranged to be fed into said distributor unit,
 e. at least one second cyclone receiving said raw-materials from said distributor unit,
 f. at least one feeding unit to which said raw-materials are fed through said second cyclone and which comprises:
  a vertical pipe,
  a hinged door arranged at said vertical pipe,
  a flywheel and camshaft arrangement arranged to give outwards directed blows to said door,
  two wheel sets rotating in opposite directions and having spiral-shaped wings for receiving said raw-materials, and
  a relatively small mixing roller arranged underneath said two wheel sets.

The equipment in accordance with the invention will be examined more closely below with reference to the embodiments in accordance with the attached drawings.

BRIEF DESCRIPTION OF THE DRAWINGS

FIGS. 6 and 6A show, in side elevation and end elevation respectively, a mixing roller belonging to the feeder in accordance with FIG. 3.

DETAILED DESCRIPTION

Figure 1:
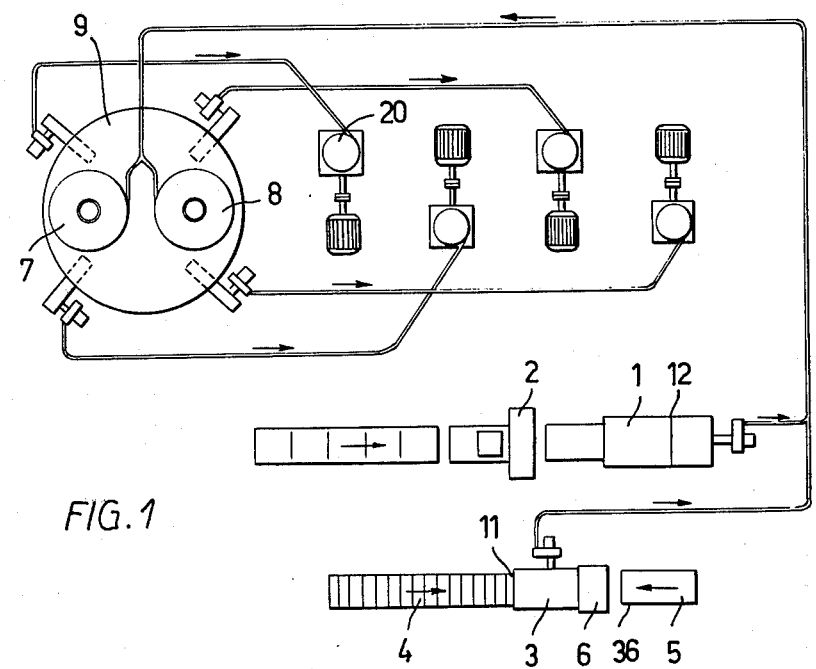
FIG. 1 partly schematically shows one embodiment of the equipment in accordance with the invention as viewed from above.
Figure 2:
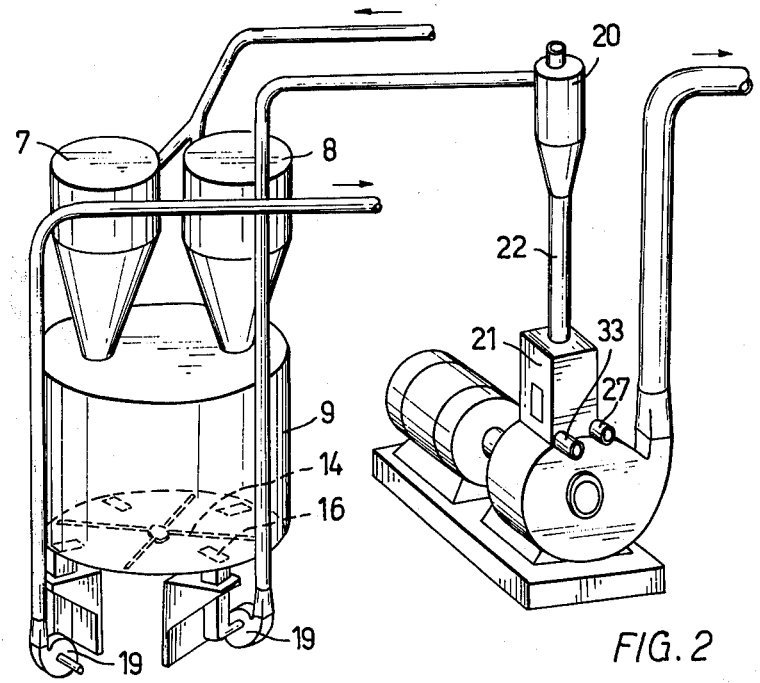
FIG. 2 shows a perspective view of a part of the equipment in accordance with FIG. 1.
Figure 3:
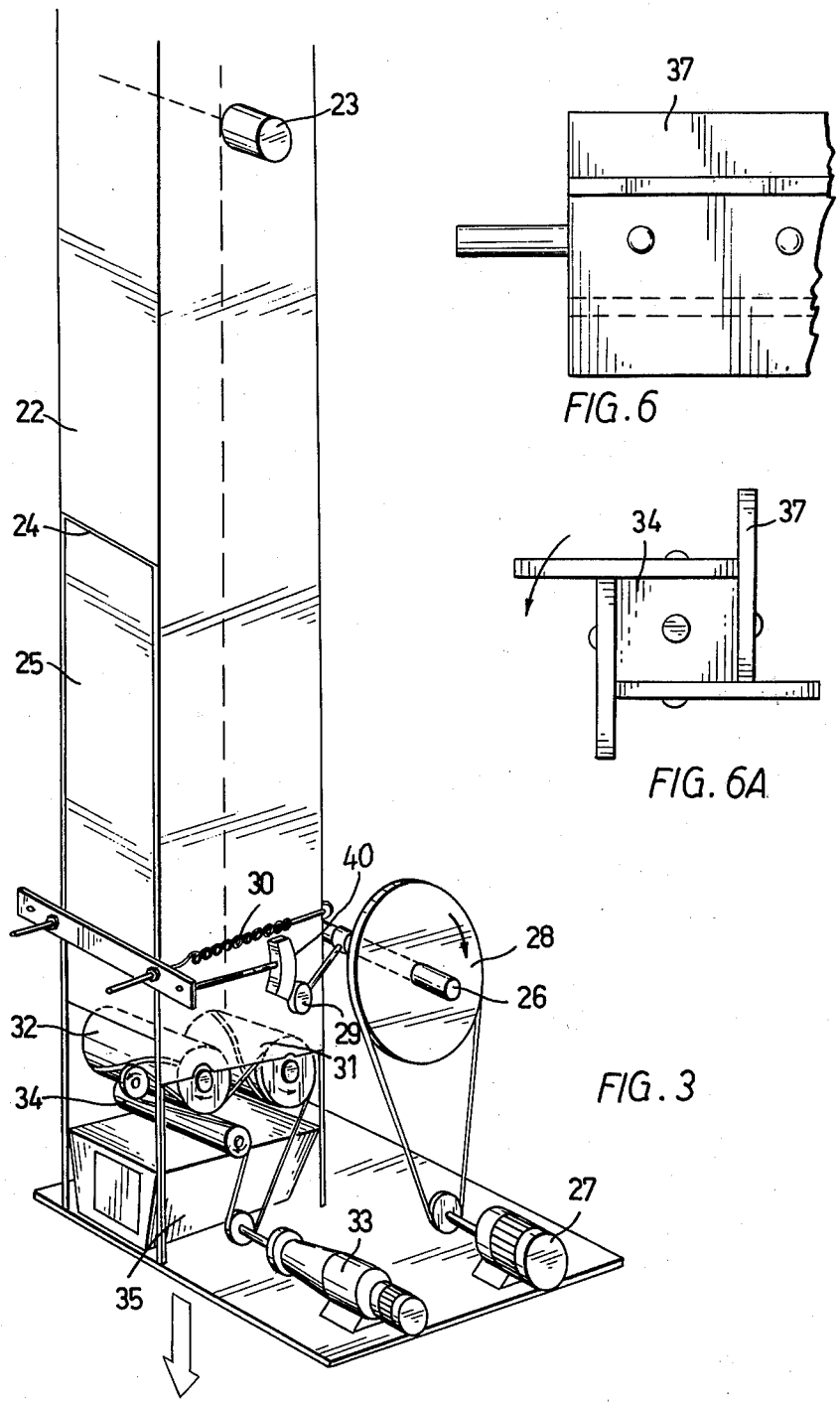
FIG. 3 shows a perspective view of a feeder belonging to the equipment in accordance with FIG. 1.
Figure 4:
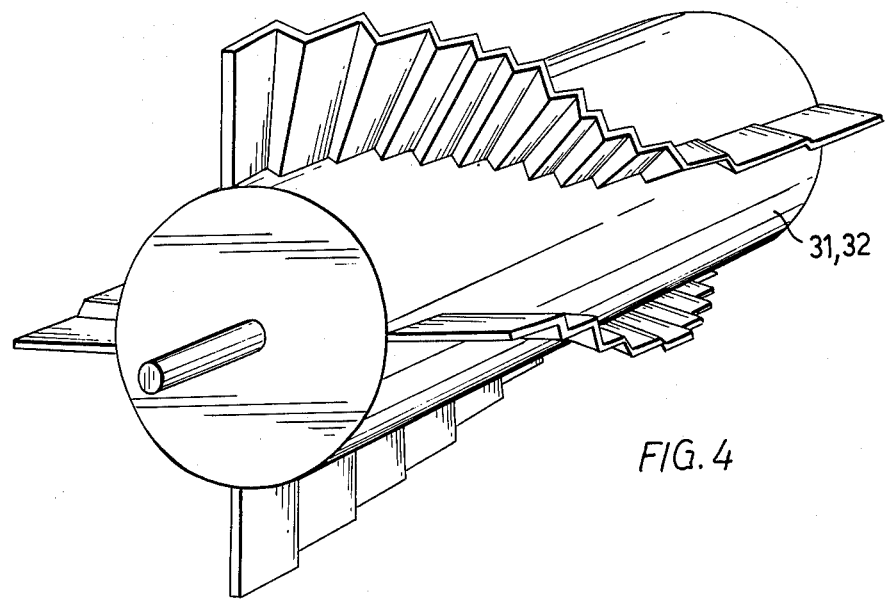
FIG. 4 shows a perspective view of one wheel of a set of wheels belonging to the feeder in accordance with FIG. 3.
Figure 5:
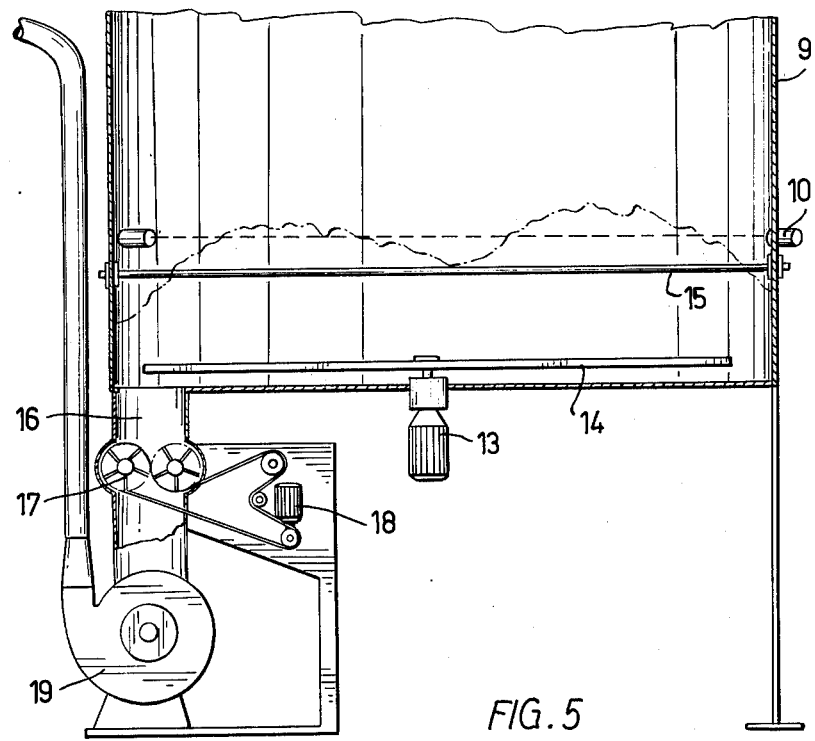
FIG. 5 shows a detail of the equipment in accordance with FIG. 2 on a larger scale.

Dry sheet cellulose is fed by means of a sheet feeding device 2 known per se, through a sheet tearing device 1, for example as described in patent application Ser. No. 516,926 filed Oct. 22, 1974, now abandoned. The disclosure of abandoned patent application Ser. No. 516,926 is hereby incorporated by reference into this application.

On the other hand, dry wood pulp is fed from the conveyor 4 through a tearing device 3 for flake-dried mechanical wood pulp, for example as described in patent application Ser. No. 516,927 filed Oct. 22, 1974, now U.S. Pat. No. 3,938,746. The disclosure of patent application Ser. No. 516,927, now U.S. Pat. No. 3,938,746, is hereby incorporated by reference into this application. Production waste is fed from the conveyor 5 through the tearing device 3, after passing through a cutter mill 6 known per se.

Blowers feed the pre-crushed and mixed raw-materials through the cyclones 7, 8 into the distributor 9. The rate of supply of the three raw-materials to the distributor 9 is controlled by means of electrical synchronisation of the feeding machines, employing an ultrasonic device 10, in order to produce a pre-selected raw-material mix.

The arms 14 of the mixing mechanism 13 rotating at the bottom of the distributor 9 and the stationary rods 15 passing through the distributor 9 mix the raw-material and distribute the mix into four short shafts 16, at the bottom end of each of which there is a twin-blade wheel mechanism 17 (N = 3000 rpm) driven by a separate motor 18.

The material received in the distributor 9 is thoroughly mixed before entering the shafts 16. Thus, before entering the distributor 9 the material has passed through a common feed pipe and through the cyclones 7 and 8, and the material is further mixed in the distributor 9 by the rotary arm 14. Therefore, the material entering the shafts 16 is a uniform mixture.

The twin-blade wheel rationing devices ration flakes into a centrifugal blower 19, which carries said prechaff through the cyclone 20 into the feeder 21 of the mill mechanism proper. A little water is fed into each centrifugal blower, whereby the water vapour produced contributes to the elimination of the static electricity in the dry pulp.

The feeder 21 consists of a rectangular tube 22, in which the level of the mix is controlled, for example, by means of a photocell 23 or equivalent. The impulse received from the photocell 23 controls the driving motor 18 of the twin-blade wheel rationing device mentioned above. Approximately at the middle of the height of the feeding pipe there is a hinge 24 at one wall, and the wall continues as a transparent plastic door 25 down to the bottom. This door is connected to a member 40 which is positioned to engage a small wheel 29 mounted on a shaft 26 which is equipped with a flywheel 28 and is driven to rotate by means of a motor 27. Thus, as the shaft 26 rotates the wheel 29 repeatedly strikes the member 40 and gives the door repeated blows directed outwards. After each blow a pair of springs 30 returns the door to its closed position. The blow frequency may be, e.g., 200 per minute.

At the bottom end of the pipe there are wheel sets 31 and 32, which have double spirals manufactured in zig-zag shape and having a uniform rise. Also, a spiral made of flat iron profile is possible. The wheel sets 31 and 32 are driven by a separate motor 33 with adjustable gear transmission. The wheel sets 31 and 32 are driven to contrarotate, and thereby feed the chaff from between them onto a small mixing roller 34, which is provided with four wings 37. The rate at which the pulp is fed from the tube 22 for further processing is determined by the speed at which the wheels 31 and 32 rotate. The roller 34 mixes the material fed by the wheels 31 and 32 by intercepting such material as it falls from the wheels 31 and 32 and altering its path of fall. From the roller 34, the chaff falls in the air flow into the shaft 35 leading to the hammer mill or equivalent concerned.

When the processing machine "orders" chaff, the motor 33 with adjustable gear transmission for the feeding rollers and the camshaft drive motor 27 are started.

The purpose of the door 25 and the mechanism for giving blows to the door and returning the door to its closed position is in order to change the cross-section of the vertical tube 22 momentarily and intermittently in order to reduce the friction when material falls down within the tube towards the wheels 31 and 32, thereby encouraging the downward movement of material within the tube 22. Since the blows applied to the door are of short duration, and the blows are applied against the force of the springs 30, the door 25 is not opened so as to enable material to leave the tube 22 but is rather vibrated through a very short distance.

When chaff is consumed, the level of material in the tube 22 falls. If the level of material is below the level of the photocell 23, the photocell 23 operates to cause the motor 18 to run, thus replenishing the material in the tube 22. If the level of material in the tube 22 reaches the level of the photocell, the photocell operates to stop the motor 18 and thus interrupt the supply of material to the tube 22.

Similarly, when the level of material in the distributor 9 is above the level of the ultrasonic device 10, the ultrasonic device stops the feeding motors 11 and 12 and the motor 36 thereby to interrupt the supply of material to the distributor 9, whereas when the level of material in the distributor 9 falls below the level of the ultrasonic device 10 the ultrasonic device operates to cause the motors 11, 12 and 36 to run thereby to replenish the material in the distributor 9. All the blowers and main machine motors are, on the contrary, controlled from elsewhere and keep rotating.

What I claim is:

1. Feeding and rationing equipment for mechanical wood pulp, production waste and equivalent, comprising:
   a. a sheet tearing unit;
   b. a tearing unit for wood pulp;
   c. a distributor unit connected to receive raw material from said two tearing units;
   d. first cyclone means connected in the path of raw material passing from said two tearing units to said distributor unit;
   e. a mixing mechanism disposed in the distributor unit to mix raw material therein;
   f. a rationing device connected to remove mixed raw material from the distributor unit at a predetermined rate;
   g. at least one feeding unit which is connected to receive material removed from the distributor unit by said rationing device and which comprises:
      a vertical pipe,
      a hinged door arranged at said vertical pipe,
      a flywheel and camshaft arrangement arranged to give outwards directed blows to said door,
      two wheels rotating in opposite directions and having spiral-shaped wings for receiving said raw materials, and a relatively small mixing roller arranged underneath said two wheels; and
   h. second cyclone means connected in the path of raw material passing from said distributor unit to said feeding unit.

2. An equipment as claimed in claim 1, wherein the distributor unit is provided with an ultrasonic device for controlling the raw-material quantity.

3. An equipment as claimed in claim 1, wherein the rationing device consists of a twin-blade wheel mechanism.

4. An equipment as claimed in claim 1, wherein the top end of the vertical pipe is provided with a device for controlling the level of the pulp.

5. An equipment as claimed in claim 1, wherein the door is provided with springs for the purpose of returning the door to its closed position.

* * * * *